Patented Sept. 21, 1948

2,449,908

UNITED STATES PATENT OFFICE 2,449,908

PREPARATION OF 2-AMINO-4-METHYL PYRIMIDINE

Charles Prevost, Paris, France, assignor to Societe Des Usines Chimiques Rhone-Poulenc, Paris, France, a French company No Drawing. Application January 2, 1946, Serial No. 638,713. In France May 26, 1944

Section 1, Public Law 690, August 8, 1946
Patent expires May 26, 1964

6 Claims. (Cl. 260—251)

This invention is for improvements in or relating to the preparation of 2-amino-4-methyl-pyrimidine.

Various different methods are known for the preparation of 2-amino-4-methyl-pyrimidine, a substance of considerable importance as an intermediate for the preparation of pharmaceutical products and in particular for the preparation of 2-(p-aminobenzene-sulphamido)-4-methyl-pyrimidine. Thus, for example, this substance has been obtained by the condensation of formyl-acetone with guanidine and by the condensation of 1:1:3:3-tetrachlorobutane with guanidine, but these known methods give yields which in general are only mediocre and involve the use of materials which are either costly or relatively inaccessible.

According to the present invention, it has now been found that it is possible to obtain 2-amino-4-methyl-pyrimidine in good yield by oxidising 1-butynol-3 (itself prepared by condensing acetylene with acetaldehyde) and condensing the 1-butynone-3 thus obtained, with a guanidine salt (for example guanidine sulphate or nitrate), preferably in sulphuric acid medium.

The following non-limitative examples illustrate the manner in which the invention can be put into effect.

Example I (a) *Oxidation.*—Into 35 g. of 1-butynol-3 (prepared for example according to United States of America Patent No. 1,950,441, DuPont de Nemours) there is run gradually with stirring a solution comprising 50 g. of potassium dichromate, 100 g. of sulphuric acid and 400 ccs. of water. During the addition, external cooling is applied in order to keep the temperature at 20° C. When the reaction is complete, the reaction mixture is distilled rapidly in steam until there is only water vapour distilling over. The distillate, after being made very faintly acid is carefully rectified. The fraction distilling at 74° C. is collected. It is an azeotropic mixture containing about 65% of 1-butynone-3 and 35% of water. By salting out this azeotrope with sodium carbonate and rectifying the product there is obtained pure 1-butynone-3 which boils at 85° C. It is an unstable substance, especially in basic medium, which polymerises rapidly, sometimes explosively. Its physiological action is similar to that of acrolein. For the subsequent condensation, it is very much more advantageous to use the butynone-water azeotrope just as it is first prepared, in which state it is much more manageable.

(b) *Condensation.*—20 g. of guanidine nitrate are dissolved in 200 cc. of 40% sulphuric acid, whereupon, at about 30° C. 12 g. of the butynone-water azeotrope are added thereto. After a few minutes, dissolution is complete. The mixture is warmed at about 50° C. for 3 hours. After being cooled, the solution is then extracted with ether to remove coloured impurities. The aqueous fraction which remains is made distinctly alkaline with excess caustic soda, the sodium sulphate thereby precipitated is removed by filtration and the filtrate is extracted with ether. The ethereal extract is dried and the ether is distilled off. The residue which remains consists of 2-amino-4-methyl-pyrimidine which is recrystallised from acetone or ethyl alcohol, when it melts at 158° C.

Example II 20 g. of guanidine sulphate are dissolved in 100 cc. of 50% sulphuric acid and, with the temperature maintained at 30° C. 12 g. of the butynone-water azeotrope, prepared by the method of Example I, are added thereto. The latter dissolves, its odour disappearing rapidly. The temperature is raised for a few minutes to 80° C. and then the mixture is cooled. It is worked up as in Example I. The yield of pure amino-2-methyl-4-pyrimidine thereby obtained is 60% of theoretical.

I claim:

1. Process for the preparation of 2-amino-4-methyl-pyrimidine which comprises condensing 1-butynone-3 with a guanidine salt, and recovering the 2-amino-4-methyl pyrimidine produced in the said condensation.

2. Process for the preparation of 2-amino-4-methyl-pyrimidine which comprises condensing 1-butynone-3 with a guanidine salt in the presence of sulphuric acid, and recovering the 2-amino-4-methyl pyrimidine produced in the said condensation.

3. Process for the preparation of 2-amino-4-methyl-pyrimidine which comprises condensing 1-butynone-3 with a guanidine salt dissolved in aqueous sulphuric acid solution, and recovering the 2-amino-4-methyl pyrimidine produced in the said condensation.

4. Process for the preparation of 2-amino-4-methyl-pyrimidine which comprises condensing 1-butynone-3 with a guanidine salt selected from the group consisting of guanidine nitrate and guanidine sulphate, and recovering the 2-amino-4-methyl pyrimidine produced in the said condensation.

5. Process for the preparation of 2-amino- 4-methyl-pyrimidine which comprises condensing 1-butynone-3 with a guanidine salt selected from the group consisting of guanidine nitrate and guanidine sulphate in the presence of aqueous sulphuric acid solution, and recovering the 2-amino-4-methyl pyrimidine produced in the said condensation.

6. Process for the preparation of 2-amino-4-methyl-pyrimidine which comprises condensing an azeotropic mixture of 1-butynone-3 and water with a guanidine salt selected from the group consisting of guanidine nitrate and guanidine sulphate dissolved in aqueous sulphuric acid solution, and recovering the 2-amino-4-methyl pyrimidine produced in the said condensation.

CHARLES PREVOST.

REFERENCES CITED

The following references are of record in the file of this patent:

Jour. of Chemical Physics, vol. 12, pp. 156–9 (1944).

Jour. Am. Chem. Soc., vol. 15, pp. 1861–3 (1936).

Compt. Rendus, vol. 180, p. 748.